US011223692B2

(12) United States Patent
Yang

(10) Patent No.: US 11,223,692 B2
(45) Date of Patent: Jan. 11, 2022

(54) SERVICE EXECUTION METHODS AND APPARATUSES

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 17/157,505

(22) Filed: Jan. 25, 2021

(65) Prior Publication Data
US 2021/0144219 A1 May 13, 2021

Related U.S. Application Data

(63) Continuation of application No. PCT/CN2019/107720, filed on Sep. 25, 2019.

(30) Foreign Application Priority Data

Nov. 27, 2018 (CN) .......................... 201811428161.5

(51) Int. Cl.
*H04L 29/08* (2006.01)
*H04L 9/08* (2006.01)
*H04L 9/32* (2006.01)

(52) U.S. Cl.
CPC .............. *H04L 67/16* (2013.01); *H04L 9/083* (2013.01); *H04L 9/3236* (2013.01); *H04L 2209/38* (2013.01); *H04L 2209/463* (2013.01)

(58) Field of Classification Search
CPC ....... H04L 67/16; H04L 9/083; H04L 9/3236; H04L 2209/56; H04L 9/3263;
(Continued)

(56) References Cited

U.S. PATENT DOCUMENTS 8,000,469 B2 * 8/2011 Buer ..................... H04L 9/0643
380/29
10,679,221 B1 * 6/2020 Rutley ................ G06Q 30/018
(Continued)

FOREIGN PATENT DOCUMENTS

| CN | 106611372 | 5/2017 |
| CN | 107222482 | 9/2017 |

(Continued)

OTHER PUBLICATIONS

Grabatin et al., Policy-Based Network and Security Management in Federated Service Infrastructures with Permissioned Blockchains, Springer, 2018.*

(Continued)

*Primary Examiner* — David Garcia Cervetti
(74) *Attorney, Agent, or Firm* — Fish & Richardson P.C.

(57) ABSTRACT

Disclosed herein are methods, systems, and apparatus, including computer programs encoded on computer storage media, for implementing service execution. One of the methods includes receiving a service request sent by a user by a service device. The service device determines a service execution policy that matches the service request based on a predetermined data analysis model and the service request by performing data analysis on a first-type blockchain transaction in a blockchain of each first-type blockchain network of at least two first-type blockchain networks. A service is executed by the service device for the service request based on the service execution policy.

20 Claims, 6 Drawing Sheets

(58) Field of Classification Search
CPC .............. H04L 9/0643; H04L 9/3297; H04L 2209/463; H04L 9/3239; H04L 9/3247; H04L 2209/38; G06F 21/64
See application file for complete search history.

(56) References Cited

U.S. PATENT DOCUMENTS

| | | | |
|---|---|---|---|
| 10,824,759 B1* | 11/2020 | Magerkurth | H04L 63/0428 |
| 10,833,843 B1* | 11/2020 | Vijayvergia | H04L 9/30 |
| 10,936,294 B2* | 3/2021 | Marks | G06F 16/2379 |
| 10,938,548 B2* | 3/2021 | Mercuri | H04L 9/0637 |
| 10,951,409 B2* | 3/2021 | Konda | H04L 63/00 |
| 2014/0181085 A1* | 6/2014 | Gokhale | G06F 16/168 707/722 |
| 2016/0358135 A1 | 12/2016 | Liao | |
| 2017/0329980 A1* | 11/2017 | Hu | G06F 21/78 |
| 2017/0345011 A1* | 11/2017 | Salami | G06Q 20/10 |
| 2018/0068091 A1* | 3/2018 | Gaidar | G06F 21/16 |
| 2018/0113752 A1* | 4/2018 | Derbakova | G06Q 40/025 |
| 2018/0189878 A1 | 7/2018 | Uhr et al. | |
| 2018/0253702 A1* | 9/2018 | Dowding | H04L 63/123 |
| 2018/0276626 A1* | 9/2018 | Laiben | G06Q 20/02 |
| 2018/0285839 A1 | 10/2018 | Yang et al. | |
| 2018/0288022 A1* | 10/2018 | Madisetti | H04L 9/14 |
| 2018/0293556 A1* | 10/2018 | Hyun | G06Q 20/4014 |
| 2018/0349572 A1* | 12/2018 | Chen | G06Q 30/06 |
| 2018/0374173 A1* | 12/2018 | Chen | G06Q 50/184 |
| 2019/0013948 A1* | 1/2019 | Mercuri | G06F 11/3072 |
| 2019/0014124 A1* | 1/2019 | Reddy | H04L 63/108 |
| 2019/0036682 A1* | 1/2019 | Qiu | H04L 9/3265 |
| 2019/0036698 A1* | 1/2019 | Anglin | H04L 9/3242 |
| 2019/0036778 A1* | 1/2019 | Bathen | H04L 41/0893 |
| 2019/0121988 A1* | 4/2019 | Ruit | H04L 9/0825 |
| 2019/0188655 A1* | 6/2019 | Pandit | G06Q 20/065 |
| 2019/0253252 A1* | 8/2019 | Qiu | G06F 21/64 |
| 2019/0253259 A1* | 8/2019 | Qiu | H04L 61/1535 |
| 2019/0253263 A1* | 8/2019 | Qiu | H04L 9/0637 |
| 2019/0303932 A1* | 10/2019 | Klaedtke | G06Q 20/223 |
| 2019/0318348 A1* | 10/2019 | Brenner | G06Q 20/1235 |
| 2019/0333056 A1* | 10/2019 | Wilkinson | G06Q 40/00 |
| 2019/0334700 A1* | 10/2019 | Callan | G06F 21/6209 |
| 2019/0340607 A1* | 11/2019 | Lynn | G06Q 20/389 |
| 2019/0349185 A1* | 11/2019 | Kim | H04L 9/3239 |
| 2019/0361992 A1* | 11/2019 | Kaguma | H04L 9/3239 |
| 2019/0370358 A1* | 12/2019 | Nation | G06F 16/1805 |
| 2020/0007312 A1* | 1/2020 | Vouk | H04L 67/104 |
| 2020/0007322 A1* | 1/2020 | Weldemariam | G06F 16/27 |
| 2020/0021590 A1* | 1/2020 | Jeuk | H04L 63/0892 |
| 2020/0076828 A1* | 3/2020 | Nainar | H04L 9/3263 |
| 2020/0125757 A1* | 4/2020 | McKendree | G06Q 50/205 |
| 2020/0142681 A1* | 5/2020 | Marks | G06F 11/3495 |
| 2020/0145189 A1* | 5/2020 | Androulaki | G06F 9/54 |
| 2020/0151350 A1* | 5/2020 | Irazabal | H04L 9/0637 |
| 2020/0159889 A1* | 5/2020 | Chui | H04L 67/104 |
| 2020/0159890 A1* | 5/2020 | Chui | G06F 16/25 |
| 2020/0160334 A1* | 5/2020 | Alba | H04L 9/0637 |
| 2020/0167319 A1* | 5/2020 | Fritz | H04L 41/0806 |
| 2020/0167339 A1* | 5/2020 | Manevich | H04L 9/0637 |
| 2020/0402026 A1* | 12/2020 | Furukawa | G06Q 20/389 |
| 2021/0160054 A1* | 5/2021 | Yang | H04L 9/0618 |
| 2021/0167942 A1* | 6/2021 | Zhang | G06Q 20/389 |

FOREIGN PATENT DOCUMENTS

| | | |
|---|---|---|
| CN | 107392040 | 11/2017 |
| CN | 107798538 | 3/2018 |
| CN | 108304478 | 7/2018 |
| CN | 108549825 | 9/2018 |
| CN | 108595709 | 9/2018 |
| CN | 108600301 | 9/2018 |
| CN | 108615148 | 10/2018 |
| CN | 108702287 | 10/2018 |
| CN | 108876403 | 11/2018 |
| CN | 110060151 | 7/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report and Written Opinion in International Application No. PCT/CN2019/107720, dated Dec. 26, 2019, 10 pages (English Abstract).
European Extended Search Report in European Application No. 19888840.6, dated Nov. 22, 2021, 9 pages.

* cited by examiner

SERVICE EXECUTION METHODS AND APPARATUSES

CROSS-REFERENCE TO RELATED APPLICATIONS

This application is a continuation of PCT Application No. PCT/CN2019/107720, filed on Sep. 25, 2019, which claims priority to Chinese Patent Application No. 201811428161.5, filed on Nov. 27, 2018, and each application is hereby incorporated by reference in its entirety.

TECHNICAL FIELD

Embodiments of the present specification relate to the field of information technologies, and in particular, to service execution methods and apparatuses.

BACKGROUND

With the development of blockchain technologies, data recording modes based on blockchain networks have gradually emerged.

For example, in the copyright protection field, it is possible to build a blockchain network for recording copyright works and copyright-related information (such as copyright owner information, copyright authorization information, copyright assignment information, etc.) of the copyright works. A user can submit a personally created target work to any node in the blockchain network, and the node constructs a blockchain transaction based on the user's personal information and the target work, and broadcasts the blockchain transaction to other nodes. One or more nodes in the blockchain network write the blockchain transaction into blockchains based on a consensus algorithm, which is equivalent to performing distributed recording of the fact "the target work was created by the user".

In fact, there are many blockchain networks that provide data recording services on the market. The blockchain networks are independent of each other, and there are information barriers among them. As a result, it is difficult to integrate the data recorded in the one or more blockchain networks for analysis and full exploration of the value of data.

SUMMARY

To alleviate the problem that the existing data recording methods are inconvenient for users, and to fully explore the value of data recorded in multiple blockchain networks, embodiments of the present specification provide service execution methods and apparatuses. Technical solutions are as follows.

According to a first aspect of some embodiments of the present specification, a service execution method is provided. A service device receives a service request sent by a user. The service device determines, based on a predetermined data analysis model and the service request, a service execution policy that matches the service request by performing data analysis on a first-type blockchain transaction in a blockchain of each first-type blockchain network of at least two first-type blockchain networks. A service is executed by the service device for the service request based on the service execution policy.

According to a second aspect of some embodiments of the present specification, a non-transitory, computer-readable medium is provided. The non-transitory, computer-readable medium stores one or more instructions executable by a computer system and cause the computer system to perform operations including: receiving, by the computer system, a service request sent by a user; determining, by the computer system based on a predetermined data analysis model and the service request, a service execution policy that matches the service request by performing data analysis on a first-type blockchain transaction in a blockchain of each first-type blockchain network of at least two first-type blockchain networks; and executing, by the computer system, a service for the service request based on the service execution policy.

According to a third aspect of some embodiments of the present specification, a computer-implemented system is provided. The computer-implemented system includes one or more computers, and one or more computer memories devices interoperably coupled with the one or more computers and having tangible, non-transitory, machine-readable media storing one or more instructions that, when executed by the one or more computers, cause the one or more computers to perform one or more operations including: receiving a service request sent by a user; determining, based on a predetermined data analysis model and the service request, a service execution policy that matches the service request by performing data analysis on a first-type blockchain transaction in a blockchain of each first-type blockchain network of at least two first-type blockchain networks; and executing a service for the service request based on the service execution policy.

According to the technical solutions provided in the embodiments of the present specification, the data recorded in the blockchains of at least two first-type blockchain networks is mapped to the blockchain of the second-type blockchain network; at least one node in each first-type blockchain network is managed by a designated manager, and at least one node in the second-type blockchain network is managed by the designated manager. Specifically, each first-type blockchain transaction constructed by any first-type blockchain network is obtained by the second-type blockchain network, and the second-type blockchain network writes the second-type blockchain transaction containing the transaction hash of the obtained first-type blockchain transaction into its own blockchain. As such, it is equivalent to further encapsulating the transaction hash of the first-type blockchain transaction stored on the blockchain of each first-type blockchain network into the second-type blockchain transaction, which is gathered on the blockchain of the second-type blockchain network. If the user wants to verify whether any first-type blockchain transaction has been written into the blockchain, the user can perform query in the second-type blockchain network based on the transaction hash of the first-type blockchain transaction. If there is a second-type blockchain transaction containing the transaction hash of the first-type blockchain transaction in the blockchain of the second-type blockchain network, it indicates that the first-type blockchain transaction has been written into the blockchain.

According to the embodiments of the present specification, if the same user uploads data to more than one blockchain network, and if the user subsequently wants to verify whether the uploaded data has been written into the blockchain, the user does not need to separately send a verification request to more than one blockchain network, but sends a verification request only to the second-type blockchain network, which is more convenient for the user.

In addition, according to the embodiments of the present specification, the data recorded in one or more first-type blockchain networks is gathered; when a service request is received, full data mining can be performed based on the complete data to determine the best service execution policy.

It should be understood that the previous general description and the following detailed description are merely examples and explanations, and cannot limit the embodiments of the present specification.

In addition, any one of the embodiments of the present specification does not need to achieve all the previous effects.

BRIEF DESCRIPTION OF DRAWINGS

To describe the technical solutions in the embodiments of the present specification or in the existing technology more clearly, the following briefly describes the accompanying drawings needed for describing the embodiments or the existing technology. The accompanying drawings in the following description merely show some embodiments of the present specification, and a person of ordinary skill in the art can still derive other drawings from these accompanying drawings.

DESCRIPTION OF EMBODIMENTS

It is worthwhile to note that, the transaction described in the present specification is a piece of data that is created by a user through a client device of a blockchain and can be eventually published to a distributed database of the blockchain. A transaction is a data structure agreed in the blockchain protocol. A piece of data can be encapsulated into a transaction for recording in the blockchain.

Transactions in the blockchain are classified into transactions in a narrow sense and transactions in a broad sense. A transaction in a narrow sense refers to a value transfer that is published by a user to the blockchain. For example, in a conventional bitcoin blockchain network, a transaction can be a funds transfer initiated by a user in the blockchain. A transaction in a broad sense refers to a piece of service data with a service intent that is published by a user to the blockchain. For example, an operator can build a consortium blockchain depending on actual service needs, and with the help of the consortium blockchain, deploy some other types of online services (such as a house rental service, a vehicle dispatching service, an insurance claim settlement service, a credit service, a medical service, etc.) that are unrelated to value transfer. In such consortium blockchain, a transaction can be a service message or service request with a service intent that is published by the user in the consortium blockchain.

To make a person skilled in the art better understand the technical solutions in the embodiments of the present specification, the following describes in detail the technical solutions in the embodiments of the present specification with reference to the accompanying drawings in the embodiments of the present specification. The described embodiments are merely some but not all of the embodiments of the present specification. All other embodiments obtained by a person of ordinary skill in the art based on the embodiments of the present specification shall fall within the protection scope of the present specification.

The following describes in detail the technical solutions in the embodiments of the present specification with reference to the accompanying drawings.

Figure 1:
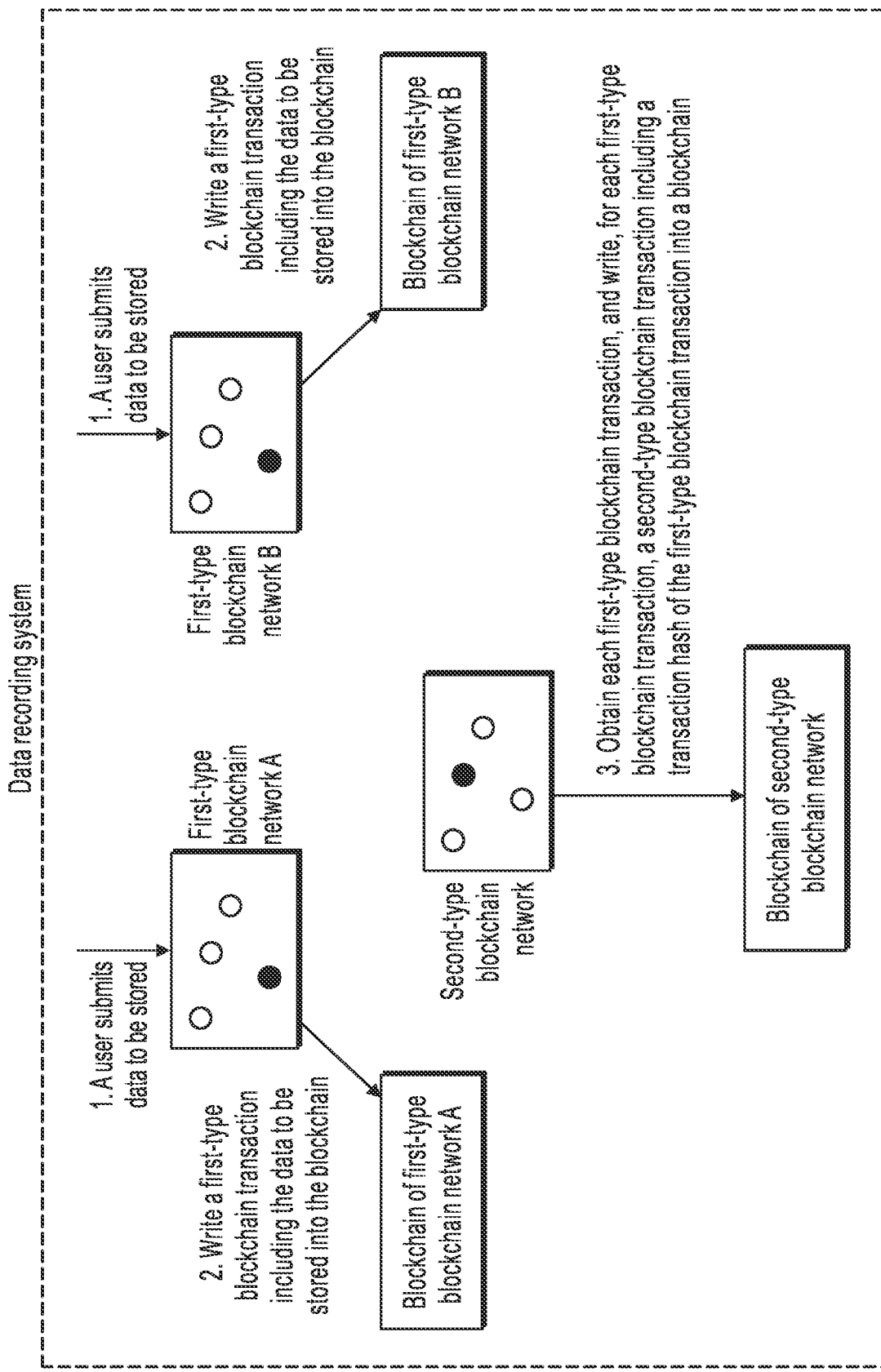
FIG. 1 is a schematic structural diagram illustrating an example of a first blockchain system based on multiple blockchain networks, according to some embodiments of the present specification.

FIG. 1 is a schematic structural diagram illustrating an example of a blockchain system (or referred to as a data recording system), according to some embodiments of the present specification. As shown in FIG. 1, the data recording system includes at least two first-type blockchain networks (two first-type blockchain networks are shown in FIG. 1) and one second-type blockchain network.

At least one node in each first-type blockchain network is managed by a designated manager, and at least one node in the second-type blockchain network is managed by the designated manager. In FIG. 1, solid nodes represent nodes managed by the designated manager.

In some embodiments, the first-type blockchain network can be a consortium blockchain network. The second-type blockchain network can be a consortium blockchain network or a private blockchain network. If the second-type blockchain network is a private blockchain network, it means that each node in the second-type blockchain network is managed by the designated manager, that is, in FIG. 3, each node in the second-type blockchain network is a solid node.

It is worthwhile to note that, if there are multiple nodes managed by the same designated manager, it means that even if the multiple nodes are nodes in different blockchain networks, the multiple nodes can share the data stored in these nodes. In other words, in FIG. 1, since the node managed by the designated manager in each first-type blockchain network stores the blockchain of the first-type blockchain network, the node managed by the designated manager in the second-type blockchain network can freely access the blockchain of the first-type blockchain network to obtain a plaintext of the first-type blockchain transaction recorded in the first-type blockchain network.

When obtaining data to be stored, any node in each first-type blockchain network constructs a first-type blockchain transaction containing the obtained data to be stored, and broadcasts the constructed first-type blockchain transaction to the first-type blockchain network. When each node in the first-type blockchain network needs to write data into the blockchain, the node packages some first-type blockchain transactions into one first-type storage block based on the consensus algorithm, and writes the first-type storage block into its own blockchain.

Any node managed by the designated manager in the second-type blockchain network obtains the first-type storage block, and calculates a transaction hash of each first-type blockchain transaction in the first-type storage block. For each transaction hash, the node constructs a second-type blockchain transaction containing the transaction hash, and broadcasts each second-type blockchain transaction to the second-type blockchain network. When each node in the second-type blockchain network needs to write data into the blockchain, the node packages some second-type blockchain transactions into one second-type storage block based on the consensus algorithm, and writes the second-type storage block into its own blockchain.

It is worthwhile to note that, in some embodiments of the present specification, the first-type blockchain network is a blockchain network responsible for recording the data to be stored submitted by the user, and the first-type blockchain transaction is a data structure containing the data to be stored. The second-type blockchain network is a blockchain network responsible for recording the transaction hash of the first-type blockchain transaction submitted by the first-type blockchain network, and the second-type blockchain transaction is a data structure containing the transaction hash of the first-type blockchain transaction.

In some embodiments of the present specification, the user can submit the data to be stored to any first-type blockchain network. Assume that the user submits the data to be stored to first-type blockchain network A. In fact, the user submits the data to be stored to any node in first-type blockchain network A. The node obtaining the data to be stored in first-type blockchain network A can construct a first-type blockchain transaction containing the data to be stored, and then broadcast the first-type blockchain transaction to other nodes in first-type blockchain network A. Each node in first-type blockchain network A usually records the obtained first-type blockchain transaction in its own cache. As time goes by, first-type blockchain network A can accommodate more and more data to be stored, which means that more and more first-type blockchain transactions are accumulated in the cache of each node in first-type blockchain network A.

Whenever the consensus trigger condition corresponding to first-type blockchain network A is satisfied, each node in first-type blockchain network A can salvage some first-type blockchain transactions from its own cache based on the consensus algorithm, and then package the salvaged first-type blockchain transactions into one first-type storage block and record the first-type storage block in its own blockchain. The consensus trigger condition corresponding to first-type blockchain network A can be that a specified period has expired, or the quantity of first-type blockchain transactions accumulated in the cache of each node reaches a specified quantity.

In addition, every time the first-type blockchain network generates a first-type storage block, the following operations are triggered. Any node managed by the designated manager in the second-type blockchain network can directly obtain the currently generated first-type storage block, and calculate a transaction hash of each first-type blockchain transaction in the first-type storage block. For each transaction hash, the node can construct a second-type blockchain transaction containing the transaction hash, and broadcast each second-type blockchain transaction to the second-type blockchain network.

Thus, whenever the consensus trigger condition corresponding to the second-type blockchain network is satisfied, each node in the second-type blockchain network can salvage some second-type blockchain transactions from its own cache based on the consensus algorithm, and then package the salvaged second-type blockchain transactions into one second-type storage block and record the second-type storage block in its own blockchain.

The following describes the data recording system shown in FIG. 1 and the data recording method based on the data recording system in more detail.

Figure 2:
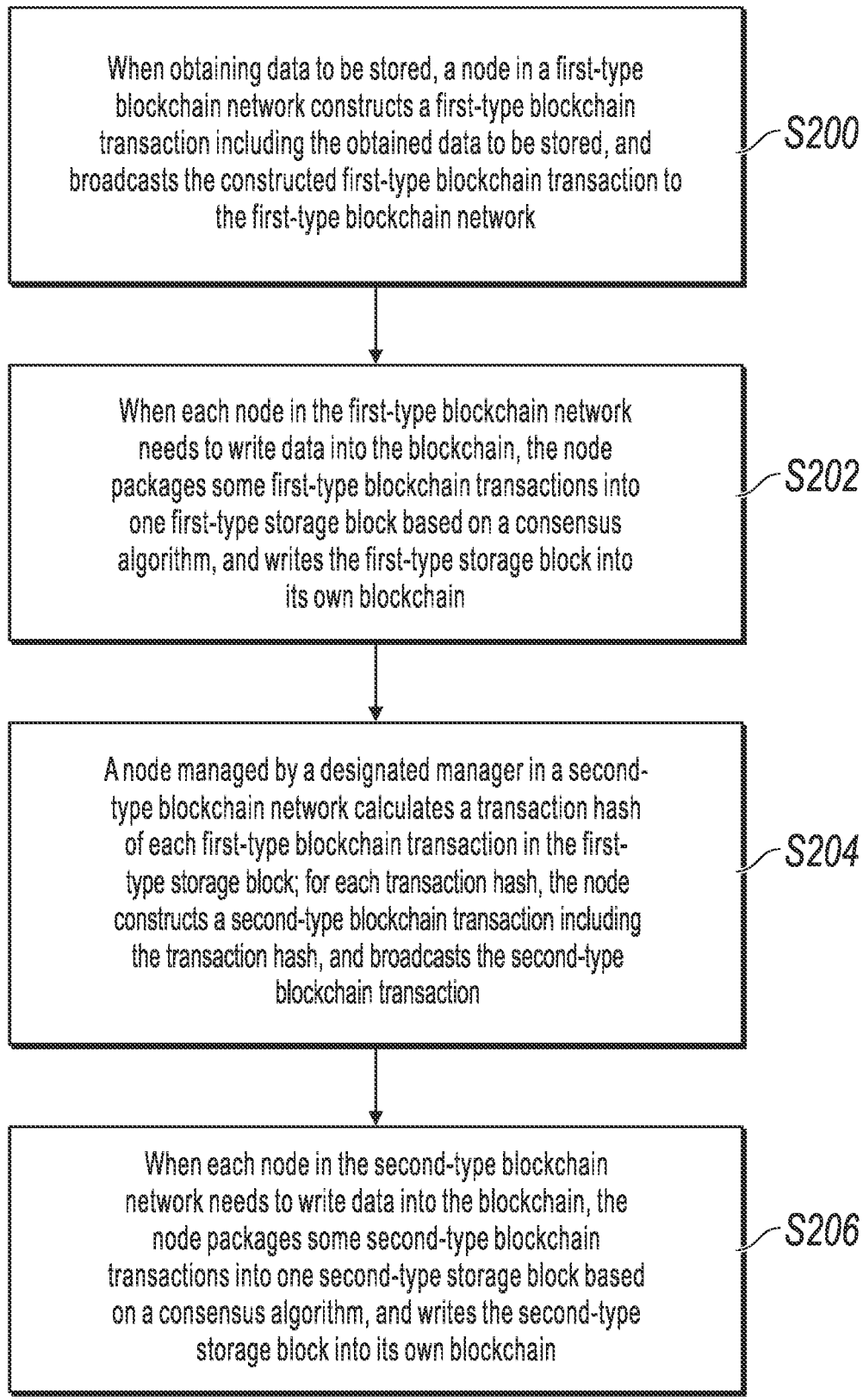
FIG. 2 is a schematic flowchart illustrating an example of a data recording method based on multiple blockchain networks, according to some embodiments of the present specification.

FIG. 2 is a schematic flowchart illustrating an example of a data recording method based on multiple blockchain networks, according to some embodiments of the present specification. The method includes the following steps.

At step S200, when obtaining data to be stored, any node in each first-type blockchain network constructs a first-type blockchain transaction containing the obtained data to be stored, and broadcasts the constructed first-type blockchain transaction to the first-type blockchain network.

At step S202, when each node in the first-type blockchain network needs to write data into the blockchain, the node packages some first-type blockchain transactions into one first-type storage block based on the consensus algorithm, and writes the first-type storage block into its own blockchain.

Steps S200 and S202 describe a process in which any first-type blockchain network records a piece of data to be stored submitted by a user. After steps S200 and S202, the data to be stored is encapsulated into a first-type blockchain transaction and then written into the blockchain of the first-type blockchain network.

At step S204, any node managed by the designated manager in the second-type blockchain network obtains the first-type storage block, and calculates a transaction hash of each first-type blockchain transaction in the first-type storage block. For each transaction hash, the node constructs a second-type blockchain transaction containing the transaction hash, and broadcasts each second-type blockchain transaction to the second-type blockchain network.

It is worthwhile to note that, step S204 can be performed before or after the previous first-type storage block is written into the blockchain. It is worthwhile to further note that, step S204 is usually performed before each node in the first-type blockchain network packages the next block.

In practice, after the user submits data to be stored to a certain first-type blockchain network, the first-type blockchain network returns a transaction hash of a first-type blockchain transaction containing the data to be stored to the user. Based on the obtained transaction hash, the user can verify whether the uploaded data to be stored has been written into the blockchain of the first-type blockchain network.

In some embodiments of the present specification, any node managed by the designated manager in the second-type blockchain network sequentially broadcasts second-type blockchain transactions corresponding to one or more first-type blockchain transactions to the second-type blockchain network based on a time sequence of the first-type blockchain transactions in the first-type storage block. As such, the time sequence of writing the second-type blockchain transactions corresponding to one or more first-type blockchain transactions into the blockchain is consistent with the time sequence of the first-type blockchain transactions in the first-type storage block.

A second-type blockchain transaction corresponding to a certain first-type blockchain transaction is a second-type blockchain transaction containing a transaction hash of the first-type blockchain transaction.

At step S206, when each node in the second-type blockchain network needs to write data into the blockchain, the node packages some second-type blockchain transactions into one second-type storage block based on the consensus algorithm, and writes the second-type storage block into its own blockchain.

In summary, in some embodiments of the present specification, the data recorded in the blockchains of at least two first-type blockchain networks is mapped to the blockchain of the second-type blockchain network. At least one node in each first-type blockchain network is managed by a designated manager, and at least one node in the second-type blockchain network is managed by the designated manager. In some embodiments, each first-type blockchain transaction constructed by any first-type blockchain network is obtained by the second-type blockchain network, and the second-type blockchain network writes the second-type blockchain transaction containing the transaction hash of the obtained first-type blockchain transaction into its own blockchain.

As such, it is equivalent to further encapsulating the transaction hash of the first-type blockchain transaction stored on the blockchain of each first-type blockchain network into the second-type blockchain transaction, which is gathered on the blockchain of the second-type blockchain network. If the user wants to verify whether any first-type blockchain transaction has been written into the blockchain, the user can perform query in the second-type blockchain network based on the transaction hash of the first-type blockchain transaction. If there is a second-type blockchain transaction containing the transaction hash of the first-type blockchain transaction in the blockchain of the second-type blockchain network, it indicates that the first-type blockchain transaction has been written into the blockchain.

According to the embodiments of the present specification, if the same user uploads data to more than one blockchain network, and if the user subsequently wants to verify whether the uploaded data has been written into the blockchain, the user does not need to separately send a verification request to more than one blockchain network, but sends a verification request only to the second-type blockchain network, which is more convenient for the user.

Figure 3:
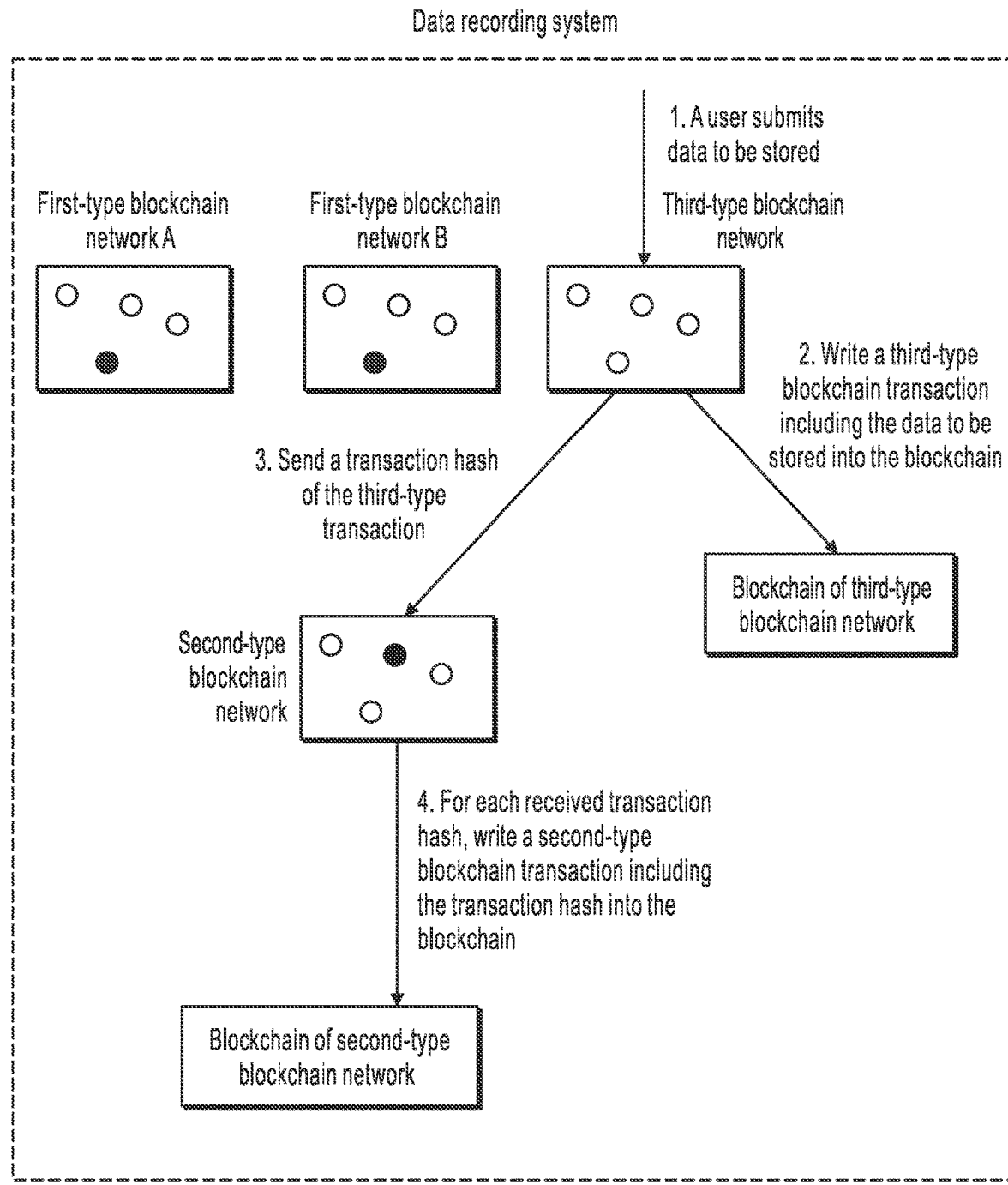
FIG. 3 is a schematic structural diagram illustrating an example of a second blockchain system based on multiple blockchain networks, according to some embodiments of the present specification.

In addition, in the embodiments of the present specification, the data recording system may further include at least one third-type blockchain network, as shown in FIG. 3. In FIG. 3, the third-type blockchain network does not include a node managed by the designated manager.

Based on the previous description, in the embodiments of the present specification, when obtaining data to be stored, any node in each third-type blockchain network constructs a third-type blockchain transaction containing the obtained data to be stored, and broadcasts the constructed third-type blockchain transaction to the third-type blockchain network.

When each node in the third-type blockchain network needs to write data into the blockchain, the node packages some third-type blockchain transactions into one third-type storage block based on the consensus algorithm, and writes the third-type storage block into its own blockchain.

In addition, any node in the third-type blockchain network can calculate a transaction hash of each third-type blockchain transaction in the third-type storage block, and send the transaction hash of each third-type blockchain transaction to a target node in the second-type blockchain network. The target node can be any node in the second-type blockchain network, or can be a predetermined node in the second-type blockchain network.

Then, for each received transaction hash, the target node constructs a second-type blockchain transaction containing the transaction hash, and broadcasts the second-type blockchain transaction corresponding to each transaction hash to the second-type blockchain network. Finally, for each third-type blockchain transaction, the second-type blockchain transaction containing the transaction hash of the third-type blockchain transaction is written into the blockchain of the second-type blockchain network.

Further, after any node in the third-type blockchain network calculates the transaction hash of each third-type blockchain transaction in the third-type storage block, the node can send the transaction hashes of one or more third-type blockchain transactions to the target node in the second-type blockchain network sequentially based on the time sequence of the third-type blockchain transactions in the third-type storage block. As such, it can be ensured that the target node can sequentially receive the transaction hashes of one or more third-type blockchain transactions based on the time sequence of the third-type blockchain transactions in the third-type storage block.

Figure 4:
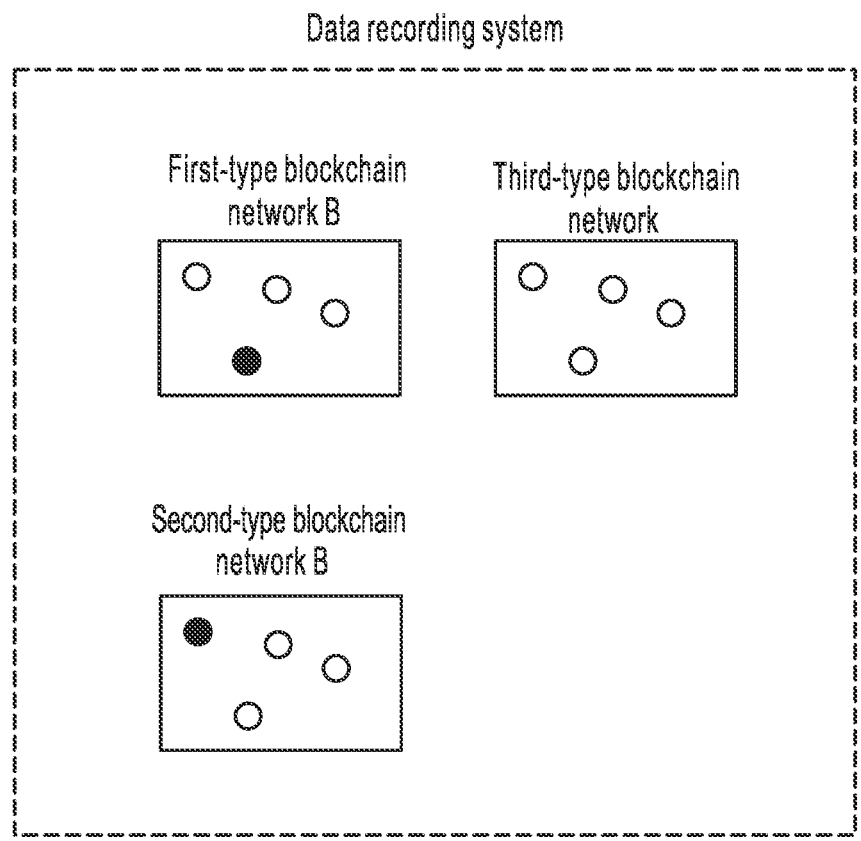
FIG. 4 is a schematic structural diagram illustrating an example of a third blockchain system based on multiple blockchain networks, according to some embodiments of the present specification.

In addition, the data recording system shown in FIG. 3 can be modified to obtain a data recording system shown in FIG. 4. In FIG. 4, the data recording system includes at least one first-type blockchain network, one second-type blockchain network, and at least one third-type blockchain network. In FIG. 4, data recording can still be performed based on the previously described principle, and details are omitted here for simplicity.

In some embodiments of the present specification, when obtaining data to be stored, any node in the second-type blockchain network constructs a second-type blockchain transaction containing the obtained data to be stored, and broadcasts the constructed second-type blockchain transaction to the second-type blockchain network. That is, the second-type blockchain network not only can record the transaction hash of each first-type blockchain transaction and the transaction hash of each third-type blockchain transaction, but also can record the data to be stored submitted by the user.

In addition, in the existing technology, after a user submits different data to be stored to more than one blockchain network, and the different data to be stored is written into the blockchain, if the user wants to read the previously submitted data to be stored from the blockchain, the user has to read the data from different blockchains maintained by more than one blockchain network.

However, in some embodiments of the present specification, when data to be stored is submitted to any first-type blockchain network, the first-type blockchain network writes a first-type blockchain transaction containing the data to be stored into its own blockchain, and any node managed by the designated manager in the second-type blockchain network broadcasts a second-type blockchain transaction containing a transaction hash of the first-type blockchain transaction and a network identifier of the first-type blockchain network to the second-type blockchain network, so that the second-type blockchain transaction is written into a blockchain of the second-type blockchain network.

In other words, in the architecture shown in FIG. 1, any node managed by the designated manager in the second-type blockchain network obtains the first-type storage block, and calculates a transaction hash of each first-type blockchain transaction in the first-type storage block. For each first-type blockchain transaction, the node constructs a second-type blockchain transaction containing a transaction hash of the first-type blockchain transaction and a network identifier of the first-type blockchain network.

When data to be stored is submitted to any third-type blockchain network, the third-type blockchain network writes a third-type blockchain transaction containing the data to be stored into its own blockchain, and sends a transaction hash of the third-type blockchain transaction containing the data to be stored to the second-type blockchain network, so that the second-type blockchain network writes a second-type blockchain transaction containing the transaction hash and a network identifier of the third-type blockchain network into its own blockchain.

In other words, in the architecture shown in FIG. 3, for each received transaction hash, the target node constructs a second-type blockchain transaction containing the transaction hash and the network identifier of the third-type blockchain network.

As such, the user who holds the transaction hash of the first-type blockchain transaction can read the first-type blockchain transaction through the second-type blockchain network. The user who holds the transaction hash of the third-type blockchain transaction can read the third-type blockchain transaction through the second-type blockchain network.

Figure 5:
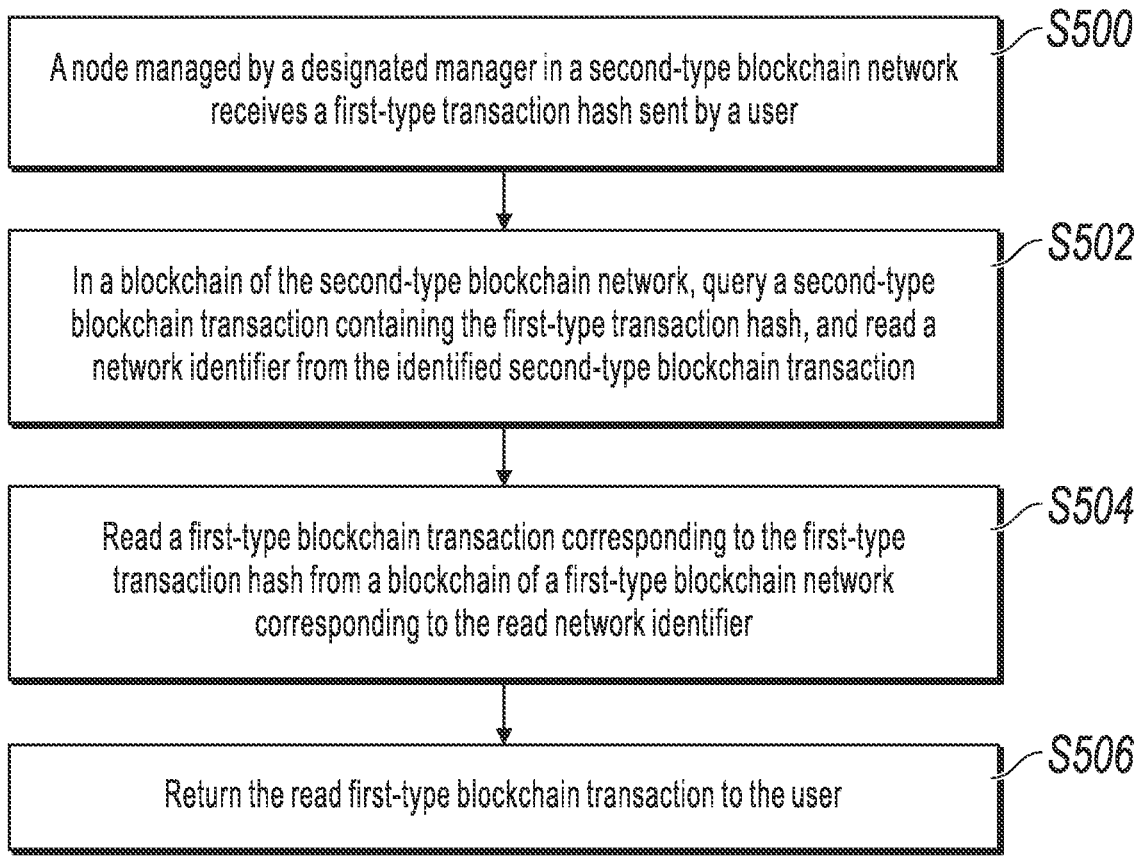
FIG. 5 is a schematic flowchart illustrating an example of a data reading method based on multiple blockchain networks, according to some embodiments of the present specification.

FIG. 5 is a schematic flowchart illustrating an example of a data reading method based on multiple blockchain networks, according to some embodiments of the present specification. The method includes the following steps.

At step S500, Any node managed by a designated manager in a second-type blockchain network receives a first-type transaction hash sent by a user.

In some embodiments of the present specification, the first-type transaction hash is a transaction hash of a to-be-read first-type blockchain transaction.

At step S502, in a blockchain of the second-type blockchain network, a second-type blockchain transaction containing the first-type transaction hash is queried, and a network identifier is read from the identified second-type blockchain transaction.

At step S504, a first-type blockchain transaction corresponding to the first-type transaction hash is read from a blockchain of a first-type blockchain network corresponding to the read network identifier.

As such, any node in the first-type blockchain network corresponding to the read network identifier can return the first-type blockchain transaction corresponding to the first-type transaction hash to the second-type blockchain network.

At step S506, the read first-type blockchain transaction is returned to the user.

It is worthwhile to note that, since data can be shared between a node managed by the designated manager in the second-type blockchain network and a node managed by the designated manager in the first-type blockchain network corresponding to the read network identifier, the node managed by the designated manager in the second-type blockchain network can actually directly obtain the first-type blockchain transaction corresponding to the first-type transaction hash without request.

In addition, in the method shown in FIG. 5, any node in the second-type blockchain network receives a third-type transaction hash sent by the user, and the third-type transaction hash is a transaction hash of a to-be-read third-type blockchain transaction. Then, in the blockchain of the second-type blockchain network, the node queries the third-type blockchain transaction containing the third-type transaction hash, and reads the network identifier from the identified third-type blockchain transaction. Next, the node sends the first-type transaction hash to a third-type blockchain network corresponding to the read network identifier to obtain a third-type blockchain transaction that is returned by the third-type blockchain network and corresponds to the third-type transaction hash. Finally, the node returns the obtained third-type blockchain transaction to the user.

Figure 6:
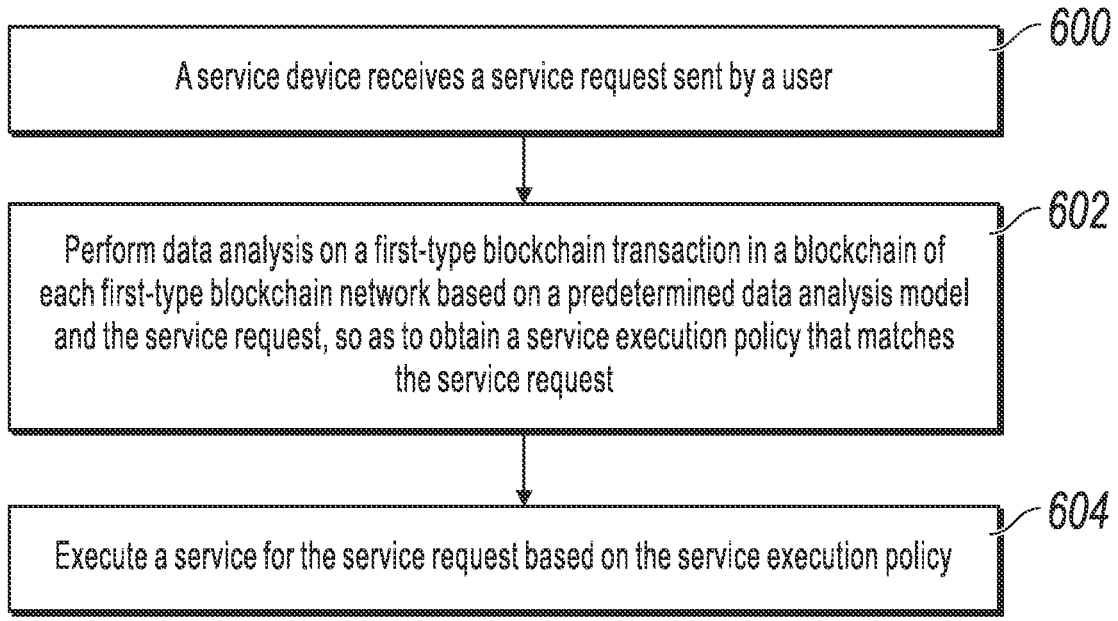
FIG. 6 is a schematic flowchart illustrating an example of a service execution method, according to some embodiments of the present specification.

Based on the data recording system shown in FIG. 1, some embodiments of the present specification provide a service execution method, as shown in FIG. 6, including the following steps.

At step S600, a service device receives a service request sent by a user.

At step S602, data analysis is performed on a first-type blockchain transaction in a blockchain of each first-type blockchain network based on a predetermined data analysis model and the service request to obtain a service execution policy that matches the service request.

At step S604, a service is executed for the service request based on the service execution policy.

Since the service device is a device managed by the designated service party, the service device has the right to freely access the blockchain of each first-type blockchain network to read data.

Further, the service device can be a node in the second-type blockchain network. As such, in the method shown in FIG. 6, the service device can construct a second-type blockchain transaction containing the service execution policy, and then broadcast the second-type blockchain transaction containing the service execution policy to other nodes in the second-type blockchain network, so that one or more nodes in the second-type blockchain network write the second-type blockchain transaction containing the service execution policy into the blockchain of the second-type blockchain network based on the consensus algorithm.

In addition, the service device can further determine a service execution result, and construct a second-type blockchain transaction containing the service execution result. Then, the service device broadcasts the second-type blockchain transaction containing the service execution result to other nodes in the second-type blockchain network, so that one or more nodes in the second-type blockchain network write the second-type blockchain transaction containing the service execution result into the blockchain of the second-type blockchain network based on the consensus algorithm.

The following uses two examples to describe the service execution method shown in FIG. 6.

EXAMPLE 1

In the scenario of copyright-related information recording, the data recording system can include two first-type blockchain networks (blockchain network A and blockchain network B) and one second-type blockchain network (blockchain network C). Blockchain network A includes a node managed by a service manager, blockchain network B also includes a node managed by the service manager, and blockchain network C is a private blockchain network built by the service manager. Blockchain network A is responsible for recording a video work uploaded by a user (which can specifically be a certain filming company) and copyright information related to the video work. Blockchain network B is responsible for recording a music work uploaded by a user (which can specifically be a certain music company) and copyright information related to the music work.

In one example, a certain filming company wants to find a suitable theme song for its movie (the movie has been submitted to blockchain network A for recording), and the filming company can send a service request to a service device of the service manager. The service request can include a transaction hash corresponding to the movie (i.e., a transaction hash of a blockchain transaction containing a data hash and a storage address of the movie). The service device can locate the blockchain transaction containing the data hash and the storage address of the movie in the blockchain based on the transaction hash, and download the movie from the storage address. Then, the service device can search for a music work with the highest matching degree with the movie in the blockchain of blockchain network B based on a predetermined data analysis model.

If the service device identifies a suitable music work, the service device reads information about a music company uploading the music work from a blockchain transaction corresponding to the music work, and provides the read information about the music company and an identifier of the music work to the filming company. The filming company can contact the music company to discuss cooperation accordingly.

EXAMPLE 2

Referring back to example 1, assume that blockchain network A is responsible for recording a music work uploaded by a user and copyright information related to the music work, and blockchain network B is also responsible for recording the music work uploaded by the user and the copyright information related to the music work.

Assume that a certain musician Tom creates two songs every month, and uploads one song to blockchain network A for recording, and the other song to blockchain network B for recording. Tom can send a request to the service device to request for a loan from the service manager, using the copyright of Tom's future song as collateral. The service manager can analyze the quantity of songs uploaded to each first-type blockchain network by Tom and the uploading frequency to evaluate Tom's repayment ability. If the service device determines through analysis that Tom can create two songs on average every month, the service device can score Tom's repayment ability accordingly. The higher the score is, the higher the loan amount can be determined by the service device for Tom.

According to the service execution method shown in FIG. 6, the data recorded in multiple blockchain networks is mapped to the same blockchain, and the data recorded in the multiple blockchain networks is gathered and analyzed to break information barriers and fully explore the value of data, thereby optimizing the service execution policy and enhancing the service level.

Figure 7:
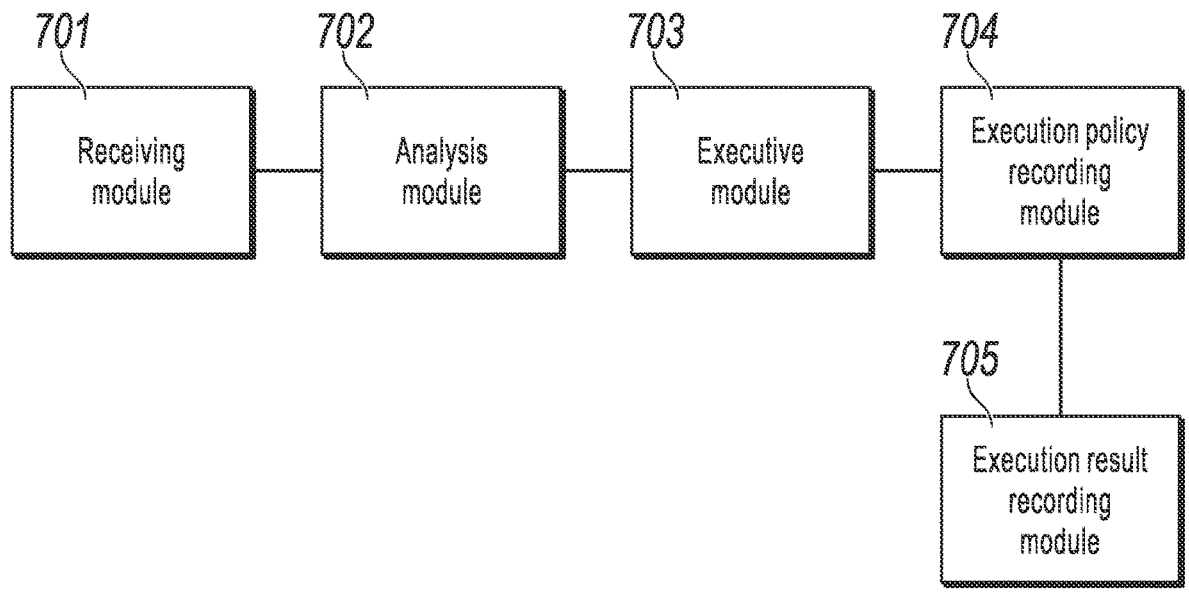
FIG. 7 is a schematic structural diagram illustrating an example of a service execution apparatus, according to some embodiments of the present specification.

Based on the service execution method shown in FIG. 6, some embodiments of the present specification further correspondingly provide a service execution apparatus, as shown in FIG. 7.

In some embodiments, a data recording system includes at least two first-type blockchain networks and one second-type blockchain network. At least one node in each first-type blockchain network is managed by a designated manager, and at least one node in the second-type blockchain network is managed by the designated manager.

When data to be stored is submitted to any first-type blockchain network, the first-type blockchain network writes a first-type blockchain transaction containing the data to be stored into its own blockchain, and any node managed by the designated manager in the second-type blockchain network broadcasts a second-type blockchain transaction containing a transaction hash of the first-type blockchain transaction and a network identifier of the first-type blockchain network to the second-type blockchain network, so that the second-type blockchain transaction is written into a blockchain of the second-type blockchain network.

The apparatus shown in FIG. 7 is a device managed by the designated service party, and the apparatus includes the following: a receiving module 701, configured to receive a service request sent by a user; an analysis module 702, configured to perform data analysis on a first-type blockchain transaction in a blockchain of each first-type blockchain network based on a predetermined data analysis model and the service request to obtain a service execution policy that matches the service request; and an execution module 703, configured to execute a service for the service request based on the service execution policy.

Each node in the second-type blockchain network is managed by a designated manager.

The apparatus is a node in the second-type blockchain network.

The apparatus further includes the following: an execution policy recording module 704, configured to construct a second-type blockchain transaction containing the service execution policy, and broadcast the second-type blockchain transaction containing the service execution policy to other nodes in the second-type blockchain network, so that one or more nodes in the second-type blockchain network write the second-type blockchain transaction containing the service execution policy into the blockchain of the second-type blockchain network based on the consensus algorithm.

The apparatus is a node in the second-type blockchain network.

The apparatus further includes the following: an execution result recording module 705, configured to determine a service execution result and construct a second-type blockchain transaction containing the service execution result, and broadcast the second-type blockchain transaction containing the service execution result to other nodes in the second-type blockchain network, so that one or more nodes in the second-type blockchain network write the second-type blockchain transaction containing the service execution result into the blockchain of the second-type blockchain network based on the consensus algorithm.

The data recording system further includes at least one third-type blockchain network.

When data to be stored is submitted to any third-type blockchain network, the third-type blockchain network writes a third-type blockchain transaction containing the data to be stored into its own blockchain, and sends a transaction hash of the third-type blockchain transaction containing the data to be stored to the second-type blockchain network, so that the second-type blockchain network writes a second-type blockchain transaction containing the transaction hash and a network identifier of the third-type blockchain network into its own blockchain.

Some embodiments of the present specification further provide a computer device, including at least a memory, a processor, and a computer program that is stored on the memory and that can run on the processor, where the processor executes the program to implement the functions of the method shown in FIG. 2.

Figure 8:
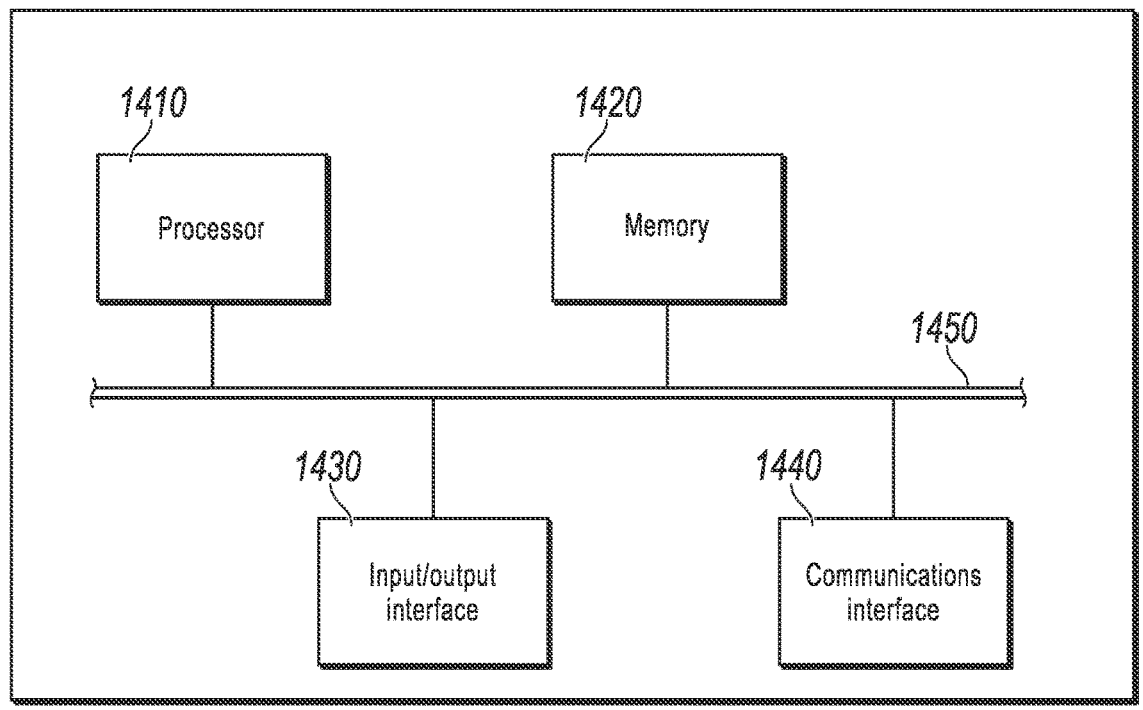
FIG. 8 is a schematic structural diagram illustrating an example of a computer device for configuring an apparatus, according to some embodiments of the present specification.

FIG. 8 is a schematic structural diagram illustrating an example of hardware of a computing device, according to some embodiments of the present specification. The device can include: a processor 1410, a memory 1420, an input/output interface 1430, a communications interface 1440, and a bus 1450. The processor 1410, the memory 1420, the input/output interface 1430, and the communications interface 1440 are communicatively connected to each other within the device by using the bus 1450.

The processor 1410 can be implemented in a form of a general-purpose central processing unit (CPU), a microprocessor, an application-specific integrated circuit (ASIC), one or more integrated circuits, etc., and is configured to execute a related program, to implement the technical solutions provided in the embodiments of the present specification.

The memory 1420 can be implemented in a form of a read-only memory (ROM), a random access memory (RAM), a static storage device, a dynamic storage device, etc. The memory 1420 can store an operating system and other application programs. When the technical solutions provided in the embodiments of the present specification are implemented by software or firmware, related program code is stored in the memory 1420, and invoked and executed by the processor 1410.

The input/output interface 1430 is configured to connect an input/output module to implement information input and output. The input/output module can be configured as a component in the device (not shown in the figure), or can be externally connected to the device to provide a corresponding function. The input device can include a keyboard, a mouse, a touchscreen, a microphone, one or more sensors, etc., and the output device can include a display, a speaker, a vibrator, an indicator, etc.

The communications interface 1440 is configured to connect a communications module (not shown in the figure) to implement communication and interaction between the device and other devices. The communications module can implement communication through a wired method (such as a USB, a network cable, etc.), or through a wireless method (such as a mobile network, Wi-Fi, Bluetooth, etc.).

The bus 1450 includes a channel to transmit information between one or more components (for example, the processor 1410, the memory 1420, the input/output interface 1430, and the communications interface 1440) of the device.

It is worthwhile to note that, although only the processor 1410, the memory 1420, the input/output interface 1430, the communications interface 1440, and the bus 1450 are shown in the previous device, in the actual implementation process, the device may further include other components that are necessary for normal operation. In addition, a person skilled in the art can understand that, the previous device can include only the components that are necessary for implementing the solutions in the embodiments of the present specification, and does not necessarily include all the components shown in the figure.

Some embodiments of the present specification further provide a computer-readable storage medium, where the medium stores a computer program, and the program is executed by a processor to implement the functions of the method shown in FIG. 8.

The computer-readable medium includes a persistent and a non-persistent, a removable and a non-removable medium, which implement information storage by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information accessible by a computing device. Based on the definition in the present specification, the computer-readable medium does not include transitory media such as a modulated data signal and carrier.

It can be determined from the previous descriptions of the implementations that, a person skilled in the art can clearly understand that the embodiments of the present specification can be implemented by using software and a necessary general hardware platform. Based on such an understanding, the technical solutions in the embodiments of the present specification essentially or the part contributing to the existing technology can be implemented in a form of a software product. The computer software product can be stored in a storage medium, such as a ROM/RAM, a magnetic disk, or an optical disc, and includes some instructions for instructing a computer device (which can be a personal computer, a server, a network device, etc.) to perform the method described in the embodiments of the present specification or in some parts of the embodiments of the present specification.

The system, method, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The embodiments in the present specification are described in a progressive way. For same or similar parts of the embodiments, mutual references can be made to the embodiments. Each embodiment focuses on a difference from other embodiments. Particularly, device embodiments are similar to method embodiments, and therefore are described briefly. For a related part, references can be made to some descriptions in the method embodiments. The previously described apparatus embodiments are merely examples. The modules described as separate parts can or does not have to be physically separate. During implementation of the solutions in the embodiments of the present specification, functions of the modules can be implemented in one or more pieces of software and/or hardware. Some or all of the modules can be selected based on an actual need to implement the solutions of the embodiments. A person of ordinary skill in the art can understand and implement the embodiments of the present specification without creative efforts.

The previous descriptions are merely specific implementations of the embodiments of the present specification. It is worthwhile to note that a person of ordinary skill in the art can further make some improvements or polishing without departing from the principle of the embodiments of the present specification, and the improvements or polishing shall fall within the protection scope of the embodiments of the present specification.

What is claimed is:

1. A computer-implemented method, comprising:
receiving, by a service device of a second-type blockchain network, a service request sent by a user, the service request comprising a transaction hash of a first-type blockchain transaction and a network identifier of a first-type blockchain network, wherein the first-type blockchain transaction is stored on the first-type blockchain network;
generating, by the service device of the second-type blockchain network and based on the transaction hash of the first-type blockchain transaction, a second-type blockchain transaction, the second-type blockchain transaction comprising the transaction hash and the network identifier of the first-type blockchain network that were included with the service request;
storing, by the service device of the second-type blockchain network, the generated second-type blockchain transaction on the second-type blockchain network;
retrieving, by the service device of the second-type blockchain network and based on the network identifier of the first-type blockchain network, the first-type blockchain transaction corresponding to the transaction hash from the first-type blockchain network;
performing, by the service device of the second-type blockchain network, data analysis on the first-type blockchain transaction in a blockchain of each first-type blockchain network of at least two first-type blockchain networks, the at least two first-type blockchain networks comprising the first-type blockchain network;
based at least on performing the data analysis, determining, by the service device of the second-type blockchain network and based on a predetermined data analysis model and the service request, a service execution policy that matches the service request; and
executing, by the service device of the second-type blockchain network, a service for the service request based on the service execution policy.

2. The method according to claim 1, wherein a data recording system comprises the at least two first-type blockchain networks and the second-type blockchain network, wherein at least one node in each first-type blockchain network is managed by a designated manager, and wherein at least one node in the second-type blockchain network is managed by the designated manager.

3. The method according to claim 2, wherein:
when data to be stored is submitted to the first-type blockchain network, the first-type blockchain network writes the first-type blockchain transaction comprising the data to be stored into the blockchain of each first-type blockchain network of the at least two first-type blockchain networks; and
each node managed by the designated manager in the second-type blockchain network broadcasts the second-type blockchain transaction comprising the transaction hash of the first-type blockchain transaction and the network identifier of the first-type blockchain network to the second-type blockchain network, wherein the second-type blockchain transaction is written into a blockchain on the second-type blockchain network.

4. The method according to claim 2, wherein each node in the second-type blockchain network is managed by the designated manager.

5. The method according to claim 2, wherein the service device is a node in the second-type blockchain network, and wherein the method further comprises:
generating, by the service device, another second-type blockchain transaction comprising the service execution policy; and
transmitting, by the service device, the another second-type blockchain transaction comprising the service execution policy to other nodes in the second-type blockchain network, wherein one or more nodes in the second-type blockchain network write the another second-type blockchain transaction comprising the service execution policy into a blockchain on the second-type blockchain network based on a consensus algorithm.

6. The method according to claim 2, wherein the service device is a node in the second-type blockchain network, and wherein the method further comprises:
determining, by the service device, a service execution result;
generating, by the service device, another second-type blockchain transaction comprising the service execution result; and
transmitting, by the service device, the another second-type blockchain transaction comprising the service execution result to other nodes in the second-type blockchain network, wherein one or more nodes in the second-type blockchain network write the another second-type blockchain transaction comprising the service execution result into a blockchain on the second-type blockchain network based on a consensus algorithm.

7. The method according to claim 2, wherein the data recording system further comprises at least one third-type blockchain network, and wherein:
when data to be stored is submitted to a third-type blockchain network, the third-type blockchain network writes a third-type blockchain transaction comprising the data to be stored into a blockchain of the third-type blockchain network, and sends a transaction hash of the third-type blockchain transaction comprising the data to be stored to the second-type blockchain network, wherein the second-type blockchain network writes a second-type blockchain transaction comprising the transaction hash and a network identifier of the third-type blockchain network into a blockchain on the second-type blockchain network.

8. A non-transitory, computer-readable medium storing one or more instructions executable by a computer system and cause the computer system to perform operations comprising:
receiving, by the computer system of a second-type blockchain network, a service request sent by a user, the service request comprising a transaction hash of a first-type blockchain transaction and a network identifier of a first-type blockchain network, wherein the first-type blockchain transaction is stored on the first-type blockchain network;
generating, by the computer system of the second-type blockchain network based on the transaction hash of the first-type blockchain transaction, a second-type blockchain transaction, the second-type blockchain transaction comprising the transaction hash and network identifier of the first-type blockchain network that were included with the service request;
storing, by the computer system of the second-type blockchain network, the generated second-type blockchain transaction on the second-type blockchain network;
retrieving, by the computer system of the second-type blockchain network and based on the network identifier of the first-type blockchain network, the first-type blockchain transaction corresponding to the transaction hash from the first-type blockchain network;
performing, by the computer system of the second-type blockchain network, data analysis on the first-type blockchain transaction in a blockchain of each first-type blockchain network of at least two first-type blockchain networks, the at least two first-type blockchain networks comprising the first-type blockchain network;

based at least on performing the data analysis, determining, by the computer system of the second-type blockchain network and based on a predetermined data analysis model and the service request, a service execution policy that matches the service request; and executing, by the computer system of the second-type blockchain network, a service for the service request based on the service execution policy.

9. The non-transitory, computer-readable medium according to claim 8, wherein a data recording system comprises the at least two first-type blockchain networks and the second-type blockchain network, wherein at least one node in each first-type blockchain network is managed by a designated manager, and wherein at least one node in the second-type blockchain network is managed by the designated manager.

10. The non-transitory, computer-readable medium according to claim 9, wherein:

when data to be stored is submitted to the first-type blockchain network, the first-type blockchain network writes the first-type blockchain transaction comprising the data to be stored into the blockchain of each first-type blockchain network of the at least two first-type blockchain networks; and each node managed by the designated manager in the second-type blockchain network broadcasts the second-type blockchain transaction comprising the transaction hash of the first-type blockchain transaction and the network identifier of the first-type blockchain network to the second-type blockchain network, wherein the second-type blockchain transaction is written into a blockchain on the second-type blockchain network.

11. The non-transitory, computer-readable medium according to claim 9, wherein each node in the second-type blockchain network is managed by the designated manager.

12. The non-transitory, computer-readable medium according to claim 9, wherein the computer system is a node in the second-type blockchain network, and wherein the operations further comprise:

generating, by the computer system, another second-type blockchain transaction comprising the service execution policy; and transmitting, by the computer system, the another second-type blockchain transaction comprising the service execution policy to other nodes in the second-type blockchain network, wherein one or more nodes in the second-type blockchain network write the another second-type blockchain transaction comprising the service execution policy into a blockchain on the second-type blockchain network based on a consensus algorithm.

13. The non-transitory, computer-readable medium according to claim 9, wherein the computer system is a node in the second-type blockchain network, and wherein the operations further comprise:

determining, by the computer system, a service execution result;

generating, by the computer system, another second-type blockchain transaction comprising the service execution result; and transmitting, by the computer system, the another second-type blockchain transaction comprising the service execution result to other nodes in the second-type blockchain network, wherein one or more nodes in the second-type blockchain network write the another second-type blockchain transaction comprising the service execution result into a blockchain on the second-type blockchain network based on a consensus algorithm.

14. The non-transitory, computer-readable medium according to claim 9, wherein the data recording system further comprises at least one third-type blockchain network, and wherein:

when data to be stored is submitted to a third-type blockchain network, the third-type blockchain network writes a third-type blockchain transaction comprising the data to be stored into a blockchain of the third-type blockchain network, and sends a transaction hash of the third-type blockchain transaction comprising the data to be stored to the second-type blockchain network, wherein the second-type blockchain network writes a second-type blockchain transaction comprising the transaction hash and a network identifier of the third-type blockchain network into a blockchain on the second-type blockchain network.

15. A computer-implemented system, comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations comprising:

receiving, over a second-type blockchain network, a service request sent by a user, the service request comprising a transaction hash of a first-type blockchain transaction and a network identifier of a first-type blockchain network, wherein the first-type blockchain transaction is stored on the first-type blockchain network;

generating, based on the transaction hash of the first-type blockchain transaction, a second-type blockchain transaction, the second-type blockchain transaction comprising the transaction hash and the network identifier of the first-type blockchain network that were included with the service request;

storing the generated second-type blockchain transaction on the second-type blockchain network;

retrieving, based on the network identifier of the first-type blockchain network, the first-type blockchain transaction corresponding to the transaction hash from the first-type blockchain network;

performing data analysis on the first-type blockchain transaction in a blockchain of each first-type blockchain network of at least two first-type blockchain networks, the at least two first-type blockchain networks comprising the first-type blockchain network;

based at least on performing the data analysis, determining, based on a predetermined data analysis model and the service request, a service execution policy that matches the service request; and executing a service for the service request based on the service execution policy.

16. The computer-implemented system according to claim 15, wherein a data recording system comprises the at least two first-type blockchain networks and the second-type blockchain network, wherein at least one node in each first-type blockchain network is managed by a designated manager, and wherein at least one node in the second-type blockchain network is managed by the designated manager.

17. The computer-implemented system according to claim 16, wherein:

when data to be stored is submitted to the first-type blockchain network, the first-type blockchain network writes the first-type blockchain transaction comprising the data to be stored into the blockchain of each first-type blockchain network of the at least two first-type blockchain networks; and each node managed by the designated manager in the second-type blockchain network broadcasts the second-type blockchain transaction comprising the transaction hash of the first-type blockchain transaction and the network identifier of the first-type blockchain network to the second-type blockchain network, wherein the second-type blockchain transaction is written into a blockchain on the second-type blockchain network.

18. The computer-implemented system according to claim 16, wherein each node in the second-type blockchain network is managed by the designated manager.

19. The computer-implemented system according to claim 16, wherein at least one of the one or more computers is a node in the second-type blockchain network, and wherein the one or more operations further comprise:

generating another second-type blockchain transaction comprising the service execution policy; and transmitting the another second-type blockchain transaction comprising the service execution policy to other nodes in the second-type blockchain network, wherein one or more nodes in the second-type blockchain network write the another second-type blockchain transaction comprising the service execution policy into a blockchain on the second-type blockchain network based on a consensus algorithm.

20. The computer-implemented system according to claim 16, wherein at least one of the one or more computers is a node in the second-type blockchain network, and wherein the one or more operations further comprise:

determining a service execution result;

generating another second-type blockchain transaction comprising the service execution result; and transmitting the another second-type blockchain transaction comprising the service execution result to other nodes in the second-type blockchain network, wherein one or more nodes in the second-type blockchain network write the another second-type blockchain transaction comprising the service execution result into a blockchain on the second-type blockchain network based on a consensus algorithm.

* * * * *